Nov. 8, 1966  H. F. RIETH  3,284,685
ELECTRICAL CAPACITOR FORMED FROM THIN FILMS
Original Filed Feb. 11, 1960  4 Sheets-Sheet 1
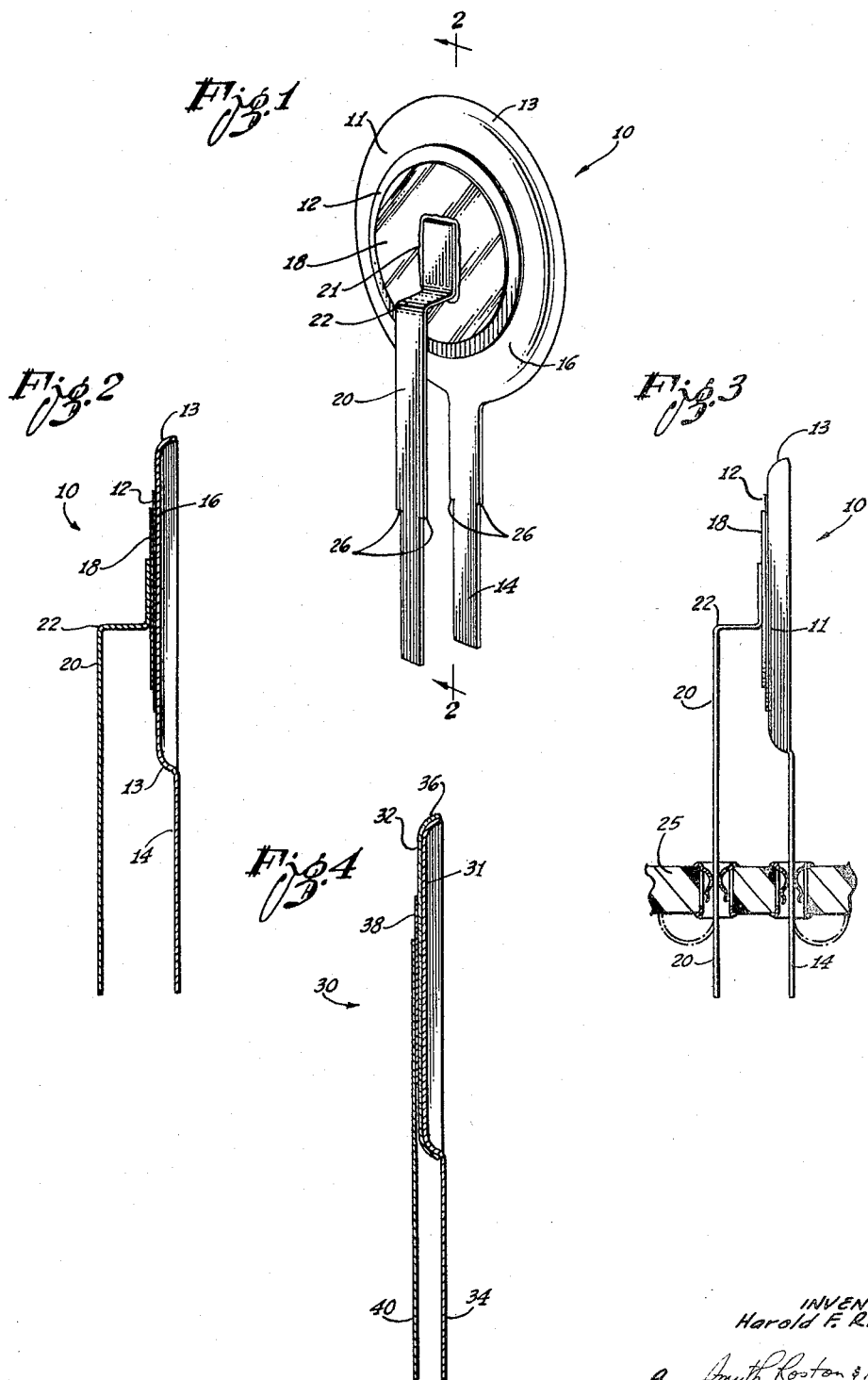
INVENTOR:
Harold F. Rieth
Smyth, Roston & Pavitt
Attorneys Nov. 8, 1966　　　　　H. F. RIETH　　　　3,284,685
ELECTRICAL CAPACITOR FORMED FROM THIN FILMS
Original Filed Feb. 11, 1960　　　　　　　4 Sheets-Sheet 2

INVENTOR:
Harold F. Rieth
Attorneys

Nov. 8, 1966 H. F. RIETH 3,284,685
ELECTRICAL CAPACITOR FORMED FROM THIN FILMS
Original Filed Feb. 11, 1960 4 Sheets-Sheet 3
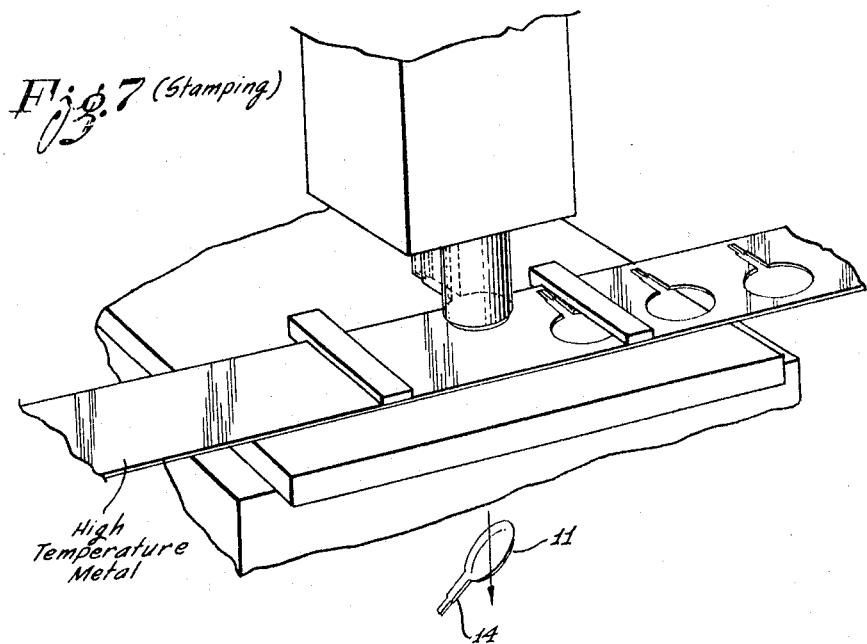
Fig. 7 (Stamping)
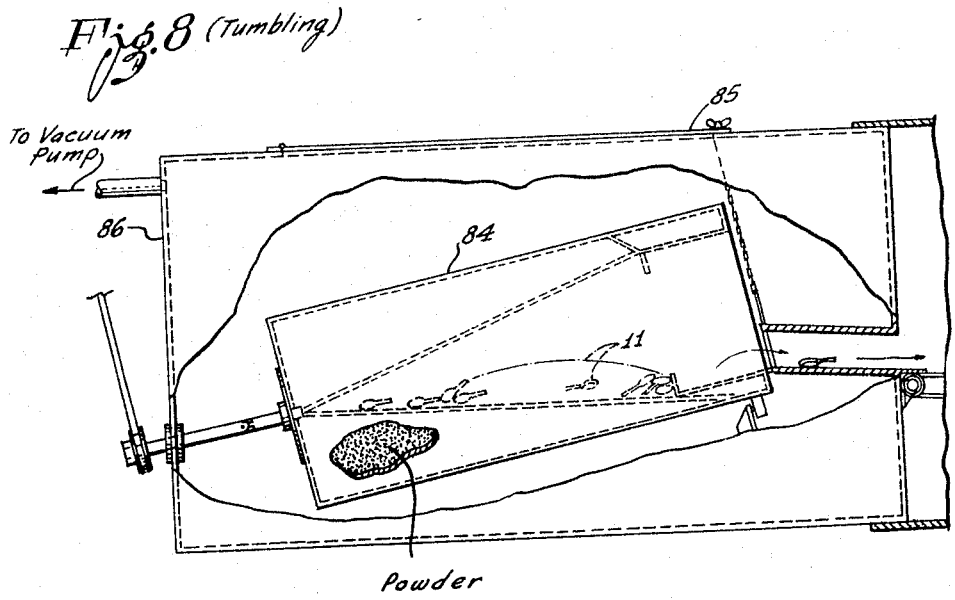
Fig. 8 (Tumbling)
INVENTOR.
Harold F. Rieth
Attorneys.

Nov. 8, 1966  H. F. RIETH  3,284,685
ELECTRICAL CAPACITOR FORMED FROM THIN FILMS
Original Filed Feb. 11, 1960  4 Sheets-Sheet 4
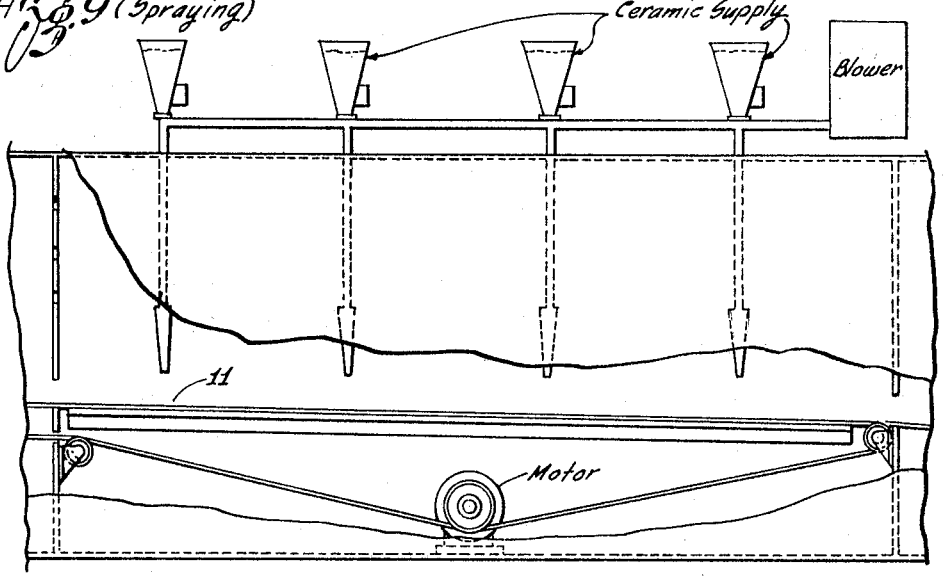
Fig. 9 (Spraying)
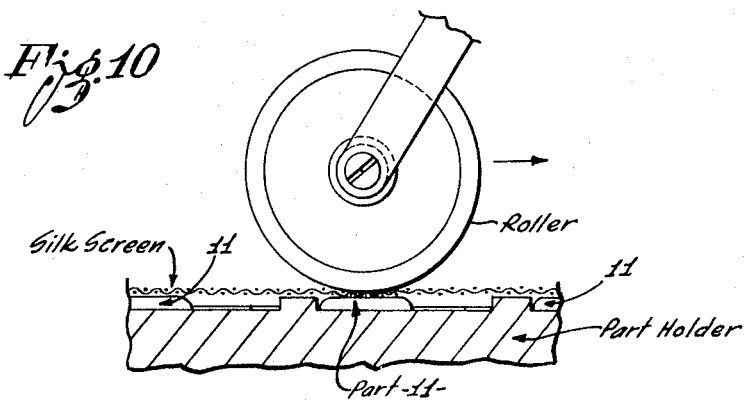
Fig. 10
INVENTOR:
Harold F. Rieth
Attorneys.

United States Patent Office  3,284,685
Patented Nov. 8, 1966

3,284,685
ELECTRICAL CAPACITOR FORMED FROM THIN FILMS
Harold F. Rieth, Los Angeles, Calif., assignor to Packard-Bell Electronics Corporation, Los Angeles, Calif., a corporation of California
Original application Feb. 11, 1960, Ser. No. 9,413, now Patent No. 3,130,475, dated Apr. 28, 1964. Divided and this application Apr. 1, 1964, Ser. No. 363,037
8 Claims. (Cl. 317—261)

This is a division of application Serial No. 9,413 filed February 11, 1960 (now U.S. Patent No. 3,130,475), which in turn was a continuation-in-part application of Serial No. 859,369 filed December 14, 1959, now abandoned by Harold F. Rieth for Thin Ceramic Disc Capacitor.

This invention relates to electrical capacitors and, more particularly, to electrical capacitors formed, in part, from a ceramic dielectric material and to a method of manufacturing such capacitors.

Capacitors are used as one of the fundamental elements in all types of electrical and electronic circuits. The capacitors may be made in various ways in accordance with the particular parameters required of the capacitors. A capacitor is formed whenever an insulator of dielectric separates two conductors between which a difference of potential can exist. A wide variety of dielectrics are utilized including air, electrolytic fluids and solid dielectrics such as mica, paper and ceramic.

Each of these types has utility in particular applications. For example, air dielectrics are principally used in variable condensers for tuning resonant circuits, and electrolytic condensers are utilized principally for filter and bypass purposes where an imposed D.C. voltage is present. Most of the fixed capacitors, however, utilize solid dielectrics because of their low electrical losses and stability. Originally, mica was utilized in solid dielectric condensers but mica is relatively expensive. Paper condensers are inexpensive in proportion to capacity and normally consist of two strips of aluminum foil insulated by paper and rolled into a bundle which is then vacuum treated, impregnated with oil or wax and sealed against moisture. A difficulty with paper condensers is that they deteriorate with time as a result of gradual penetration of moisture and are bulky for miniaturized circuits.

In the last several years, ceramic dielectric condensers have been utilized in greater numbers. The conventional ceramic disc capacitor consists of ceramic fired at approximately 2000 degrees centigrade. After firing, silver patterns are screened onto the two sides of the ceramic and fired at approximately 1000 degrees centigrade into the ceramic. Leads are thereafter attached to the silver patterns by normal soldering operations. Often, the capacitors are then dipped into a plastic insulator, which insulator impregnates and furnishes further mechanical strength to the capacitor.

The ceramic capacitors are relatively strong when the ceramic has a thickness to withstand voltages utilized in vacuum tube circuits, i.e. 500 volts. To withstand 500 volts, a thickness of approximately 0.020 inch is utilized. For transistor circuit applications, the breakdown potential of the capacitor may be as low as 25 volts so that theoretically a thickness of only 0.001 inch is required. The capacitance varies inversely with the distance between the plates so that large capacitive values could be achieved with thin disc capacitors. The miniaturization of capacitors by such factors would have considerable utility in many applications.

A difficulty in reducing the thickness, however, is that the disc becomes very brittle or fragile and, accordingly, difficult to manufacture and subsequently handle. For example, the shape of a very thin piece of ceramic distorts and often breaks when it is fired at 2000 degrees centigrade. Another difficulty is that because of the thinness of the ceramic, relatively small amounts of contaminants in the ceramic materially affect its dielectric strength. The contaminants may be introduced during the firing of the silver patterns onto the ceramic. For these reasons, thin ceramic capacitors have heretofore been impractical.

In a specific illustrative embodiment of this invention, a ceramic capacitor is provided which utilizes a very thin layer of ceramic, approximately 0.004 inch thick and which has a considerable structural strength. Though the ceramic capacitor is quite small and readily utilizable in miniature circuits, it is not brittle and it provides for considerable capacitance though at lower breakdown voltages (25 volts) than was heretofore possible. The thin ceramic layer provides for considerable capacitance because it is substantially contaminant free and, therefore, has a substantially high dielectric strength.

In the specific illustrative embodiment, the ceramic capacitor includes as one plate a high temperature metal disc which has a flared or turned-down periphery. The flared periphery provides for considerable structural strength even though the metal disc is quite thin. The metal disc is fabricated by a stamping operation which stamps one terminal of the capacitor as an integral part of the metal disc. The terminal is a strip of metal integral with the flared periphery of the metal disc. The stamped disc is then tumbled in a powder of the ceramic material at an elevated temperature but below the firing temperature of the ceramic. The tumbling step may be in a vacuum to facilitate the emission of impurities such as carbon, sulfur, phosphorous, selenium, hydrogen, nitrogen, etc., in the high temperature metal disc. Any oxides formed on the metal disc come off in the tumbling operation. The impurities diffuse into the ceramic powder.

Thereafter, a thin layer of ceramic is sprayed and then fired on the face of the metal disc. When the ceramic is fired on the metal disc, it is not contaminated by impurities in the metal disc due to the tumbling operation which essentially removed them. After the ceramic is fired to the metal disc, a silver pattern is screened and then fired onto the ceramic layer. Both the ceramic and silver layers are very thin and the thermal coefficient of expansion of the metal and the ceramic are approximately the same. The tumbling, spraying and firing of the ceramic, and screening and firing of the silver, may take place in a vacuum to prevent contaminants in the air from entering the ceramic. A second strip terminal for the capacitor is soldered to the silver pattern which forms the other plate of the capacitor.

The two terminals, which function as electrical connections to the plates of the capacitor also are utilized for mounting the ceramic capacitor on a printed circuit board. The two terminals, which may be substantially parallel, extend through holes in the printed board to support the capacitor. The terminals include shoulders for limiting their movement through the board.

In a second embodiment of this invention, a thin layer of ceramic is provided over one entire face of the metal disc as a safety feature so as to provide for an insulation between the second terminal and the metal disc to prevent a shorting contact therebetween. In further embodiments of this invention, separate silver patterns may be screened on the ceramic to form a number of capacitors. The disc may also function as a common terminal with a ceramic layer being affixed to the back or inside of the basin-shaped disc as well as to its face. Only a single metal disc is required for either of these further embodiments.

Further advantages and features of this invention will become apparent upon consideration of the following description when read in conjunction with the drawing wherein:

FIGURE 1 is a perspective view of one embodiment of the thin ceramic capacitor of this invention;

FIGURE 2 is a sectional view through a diametric axis of the one embodiment of the thin ceramic capacitor of this invention;

FIGURE 3 is a side view of the one embodiment of the thin ceramic capacitor of this invention illustrating how it is mounted on a printed board;

FIGURE 4 is a sectional view of another embodiment of the thin ceramic capacitor of this invention where the ceramic layer extends over the entire face of the metal disc;

FIGURE 7 is a diagrammatic representation illustrating the stamping step of the method of fabricating the thin ceramic capacitor;

FIGURE 8 is a diagrammatic representation illustrating the tumbling step of the method of fabricating the thin ceramic capacitor;

FIGURE 9 is a diagrammatic representation illustrating the step of spraying the ceramic on the metal disc; and FIGURE 10 is a diagrammatic representation illustrating the step of screening the silver pattern on the ceramic layer of the ceramic capacitor.

Figure 5:
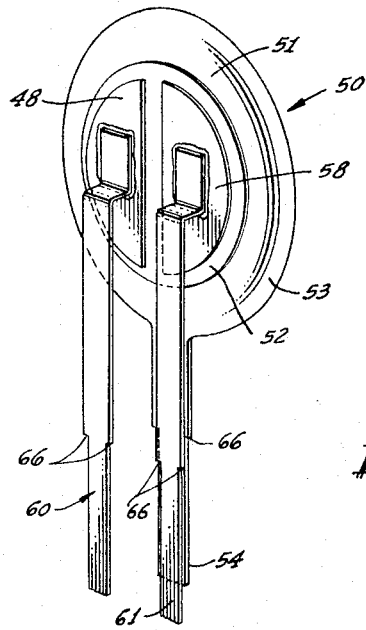
FIGURE 5 is a perspective view of still another embodiment of this invention wherein a number of electrical capacitors are provided utilizing a single metal disc.

Referring first to FIGURES 1 through 3, a thin ceramic capacitor 10 is depicted having a high temperature metal disc 11. The disc 11 may be made of a suitable material such as a Monel metal alloy or stainless steel which withstands temperatures over 2500 degrees centigrade and preferably over 3000 degrees centigrade. The disc 11 is made of a high temperature metal because, as is hereinafter described, a thin layer 12 of ceramic material is fired at a relatively high temperature on one side of the disc 11 and it is necessary for the disc to retain its characteristics at the firing temperature. The disc 11 may be quite thin, having a thickness of illustratively 0.0025 inch. The thickness of the disc 11 as well as the other parts forming the thin ceramic capacitor are exaggerated in the drawing.

The disc 11 has a flared or turned-down peripheral edge 13 to form a basin shape which has a flat central portion and a thin arcuate peripheral portion. The disc 11 is fabricated by a stamping process illustrated in FIGURE 7 and has a thin strip 14 integral therewith and extending from the flared peripheral edge 13. The strip 14 and the rest of the disc 11 are contiguous being stamped from a single piece of metal. The strip 14 forms one terminal of the thin ceramic capacitor 10 and the rest of the disc 11 forms one plate of the thin ceramic capacitor 10.

After the metal disc 11 has been stamped, it is tumbled in powdered ceramic, as illustrated in FIGURE 8, to remove the impurities or contaminants in the metal which have an affinity for the ceramic. The ceramic, illustratively, may be barium titanate which is a ferroelectric material having a high dielectric constant. The tumbling operation is at an elevated temperature, somewhat less than the firing temperature of the ceramic. The ceramic powder accordingly does not melt during the tumbling operation. The elevated temperature in which the disc 11 are tumbled may illustratively be at 1800 degree centigrade, and the firing temperature of the ceramic may be 2000 degrees centigrade. With the metal disc 11 heated to the elevated temperature, various gaseous and solid impurities in the metal 10 are emitted during the tumbling operation. Such impurities include carbon, sulfur, phosphorous, selenium, hydrogen and nitrogen. The apparatus for tumbling the disc 11 includes a rotating cylinder 84 which is positioned in a vacuum chamber 86. The chamber 86 has a removable sealing plate 85 permitting access to the cylinder 84. The powdered ceramic, which is placed in the cylinder 84 and heated to the elevated tumbling temperature may be periodically replaced.

The impurities having an affinity for the ceramic are picked up by the ceramic powder during the tumbling operation. The ceramic powder, in this manner, functions as a scavenger for picking up possible contaminants of the thin ceramic layer 12 mentioned above. The powder also functions as an abrasive so that any oxides formed on the surface of the metal disc 11 comes off during the tumbling operation. Merely heating the metal disc to expel the contaminants removes some of them. The tumbling operation is in a vacuum to prevent gases from entering the metal after the tumbling operation. The cylinder 84, in which the discs 11 are tumbled or shaken, may have an internal surface made of a ceramic material to prevent introducing additional contaminants. If a metal container is utilized, contaminants therefrom are introduced to the ceramic powder so that the powder has to be changed more often. The ceramic material of the cylinder 84 may have a higher melt temperature than that of the ceramic powder and may illustratively be steatite.

After the tumbling operation, some of the powder may remain in the pores on the face of the disc 11. When, however, as is hereinafter described, the ceramic layer 12 is fired into the disc 11, the powder in the pores fuses with the ceramic layer sprayed on the disc 11. The powder, therefore, increases the bond between the ceramic material and the disc 11 because it fits into the interstices at the surface of the metal.

As indicated above, and as illustrated in FIGURE 9, a thin layer 12 of ceramic material is sprayed, pasted or otherwise disposed on the side 16 of the disc 11 after it has been decontaminated during the tumbling operation. The thin layer 12 of ceramic material may have a thickness of approximately 0.004 inch and may be made of the same material as the powder used in the tumbling operation. As indicated above, the powder may be barium titanate. The ceramic material has a high dielectric coefficient and is relatively non-porous so that a very thin layer of noncontaminated ceramic is effective as an insulation or dielectric for the capacitor 10. The ceramic layer 12 is fired into the side 16 of the metal disc 11 at a temperature of approximately 2000 degrees centigrade in a vacuum. The disc 11, as indicated above, is made of a high temperature metal so that it does not distort due to being exposed to a 2000 degree centigrade temperature. The flared end 13, moreover, imparts substantial structural strength to the disc 11 to prevent distortions or flexing during the firing operation and subsequent handling during the rest of the fabrication of the capacitor 10 and by the user and, thereafter, when it is mounted in an electrical apparatus. The powder picked up in the pores of the metal fuses with the sprayed ceramic to increase the bond between it and the metal.

The disc 11 and the ceramic material forming the layer 12 both advantageously have similar thermal coefficients of expansion. Illustratively, the thermal coefficients of expansion may be $1.6 \times 10^{-5}$ per degree centigrade. It is advisable to provide similar coefficients of expansion to prevent the multiple cracking of the layer 12 or the separation of the layer 12 from the disc 11 during subsequent firing operations or when the capacitor 10 is in use and the temperature to which it is exposed varies materially.

After the ceramic layer 12 has been fired into the metal disc 11, a layer of conductive material forming a layer 18 is deposited on the ceramic layer 12 as illustrated in FIGURE 10. The conductive material may be silver and the silver pattern may be screened on the ceramic layer 12. After screening, the silver layer 18 is fired into the ceramic layer 12 at a temperature of approximately 1000 degrees centigrade. As shown in FIGURE 1, the layer 12 of ceramic material does not fully cover the side 16 of the disc 11 and the layer 18 of silver does not fully cover the layer 12 of ceramic material. The layer 18 does not fully cover the layer 12 to insure that it does not form a conductive contact or short with the disc 11. The layer 18 of conductive material defines the second plate of the thin ceramic capacitor 10.

The layer 18 may be screened and plated on the ceramic layer 12 in a vacuum to prevent gases from entering the heated ceramic. The various steps, including the tumbling operation, the ceramic spraying and firing, and the metallic layer screening and firing may all take place in one continuous vacuum chamber.

After the metallic layer 18 has been fired into the ceramic, a thin strip 20 of conductive material is soldered at 21 to the layer 18 of silver and forms a second terminal for the thin ceramic capacitor 10. With the strip 20 attached, the capacitor may be dipped into an insulator plastic. The strip 20 is bent at 22 to insure that it does not contact the side 16 of the disc 11. The two strips 14 and 20 may be parallel to facilitate the mounting of the capacitor 10 in a printed board 25. The strips 14 and 20 may be offset somewhat so as not to be directly opposite each other though they are in parallel planes. The offset is a safety feature to prevent the strips from being entangled or contacting each other during shipment, handling or after assembly. If the strip 20 is soldered off-center on the layer 18, the two strips are offset. FIGURES 2 and 3 are identical for a capacitor having offset strips as well as for one having parallel strips.

Each of the strips 14 and 20 has shoulders 26 which act as a stop for the printed board 25. The strips 14 and 20 may be press-fitted into the board 25 and they may be bent under the board 25 to securely maintain the capacitor 10 in position on the board 25. Moreover, the strips 14 and 20 may form conductive connections with printed conductive areas, not shown, on the board 25.

The capacitor 10, in this manner, is quite rugged though thin. The capacitance provided by the structural arrangement may be relatively high because of the very small thickness of the ceramic layer 12. The capacitor 10, moreover, is relatively inexpensive to manufacture.

In the embodiment disclosed above in reference to FIGURES 1 through 3, the ceramic layer 12 is centrally located on the side 16 which is the back of the basin-shaped disc 11. In the embodiment shown in FIGURE 4, a ceramic layer 32 is deposited over the entire side 36 of the disc 31. The disc 31 forms one plate of a ceramic capacitor 30 and may have the same shape as the disc 11 shown in FIGURES 1 through 3. The method of manufacturing the capacitor 30 is the same as described above for the capacitor 10 except that the ceramic layer 32 extends over the whole side 36 of the disc 31. A silver layer 38 is fired onto the central portion of the ceramic layer 32, and a strip of metal 40 is soldered to the layer 38.

The strip 40, which forms one terminal of the capacitor 30, is straight and not bent as is the strip 20 of the capacitor 10. The strip 40 may be straight because it is safely insulated from a strip 34 forming the other terminal of the capacitor 30. The strip 34 is integral with the disc 31. The strips 34 and 40 cannot readily contact each other because the ceramic layer 32 extends over the entire side 16 forming a safety insulation spacer between the strips 34 and 40. The strips 34 and 40 may have shoulders, as do the strips 14 and 20, to facilitate the mounting of the ceramic capacitor 30. The strips 34 and 40 may also be offset to further reduce the possibility of them contacting each other.

In the two embodiments described above, one shown in FIGURES 1 through 3 and the other shown in FIGURE 4, a single capacitive element is disclosed. In the embodiments shown in FIGURES 5 and 6, however, multiple capacitive elements are depicted in that each element forms a number of capacitors.

In the embodiment shown in FIGURE 5, a thin disc multiple capacitive element 50 is provided which has a thin disc 51 substantially similar to the thin disc 11 described above and shown in FIGURES 1 through 3. The thin disc 51 has a flared end 53 and is contiguous with a terminal strip 54 which forms a common terminal for the element 50. A ceramic layer 52 is affixed to the face of the thin disc 51 in a manner similar to that described above for affixing the ceramic layer 12 to the disc 11 in FIGURE 1. Instead of a single silver pattern, however, being affixed to the ceramic layer, a number of silver patterns 48 and 58 are affixed thereto. The two silver layers 48 and 58 are not contiguous in that they do not electrically contact each other. Two terminal strips 60 and 61 are respectively soldered to the two layers 48 and 58.

In this manner, a double capacitive element is provided with the disc 51 forming a common plate for the other two plates formed by the layers 48 and 58. The present invention is not restricted to the provision of only two layers 48 and 58 as any number may be provided with each forming another capacitor and the disc 51 being common to all.

Figure 6:
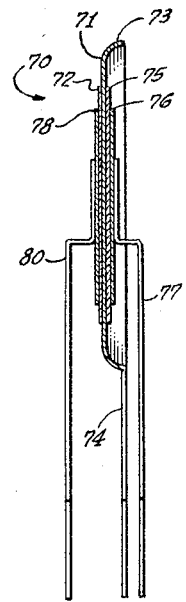
FIGURE 6 is a sectional view of still a further embodiment of this invention wherein a number of electrical capacitors are provided utilizing both sides of a single metal disc.

In the embodiment shown in FIGURE 6, another multiple capacitive element 70 is provided. The element 70 has a thin disc 71 which is also similar to the thin disc 11 shown in FIGURES 1 through 3. The disc 71 has a flared end 73 providing for increased structural strength and has affixed respectively to its opposite sides two ceramic layers 72 and 75. The ceramic layer 72 is affixed to the face or back of the basin shape formed by the flared end 73 of the thin disc 71. The ceramic layer 75 is affixed to the inside of the basin shape formed by the flared end 73. The two ceramic layers 72 and 75 may be fired simultaneously onto the thin metallic disc 71. The ceramic layers 72 and 75 have affixed thereto respectively silver layers 78 and 76 which form plates of the multiple capacitive element 70. Terminal strips 80 and 77 are soldered respectively to the two silver layers 78 and 76 and a common terminal strip 74 is provided which may be contiguous with the metallic disc 71.

In this manner, a double capacitive element is provided with the disc 71 functioning as a common plate for the two plates in the form of the silver layers 78 and 76 which are at each of its two sides. The disc 71 forms the main structural element of the element 11 just as the thin metallic discs do in the other described embodiments.

Although this invention has been disclosed and illustrated with reference to particular applications, the principles involved are susceptible of numerous other applications which will be apparent to persons skilled in the art. For example, the various steps do not have to be in the presence of a vacuum. The vacuum serves to further reduce the amount of contaminants in the ceramic layer but they are considerably reduced even if the tumbling etc. takes place in air at normal atmospheric pressures. The invention is, therefore, to be limited only as indicated by the scope of the appended claims.

I claim:

1. A thin ceramic capacitor, including, a metallic disc of high temperature conductive material forming one plate of the capacitor and having a flared periphery turned down in a direction perpendicular to the diametric axes of the disc to increase the structural strength of the disc, a thin layer of ceramic material forming the dielectric of the capacitor and fused to the side of said disc which is opposite to the direction that the flared periphery is turned down, a metallic layer forming a second plate of the capacitor and fused to said thin ceramic layer, a first terminal strip for the capacitor soldered to said metallic layer, and a second terminal strip for the capacitor integral with said metallic disc at a portion of its flared periphery.

2. A thin ceramic capacitor, including, a metallic disc of high temperature conductive material forming one plate of the capacitor and having a flared periphery turned down in a direction perpendicular to the diametric axes of the disc to increase the structural strength of the capacitor, a thin layer of ceramic material forming the dielectric of the capacitor and fused to the side of said disc which is opposite to the direction that the flared periphery is turned down, a metallic layer forming a second plate of the capacitor and fused to said thin ceramic layer, a first terminal strip for the capacitor soldered to said metallic layer, and a second terminal strip for the capacitor integral with said metallic disc at a portion of its flared periphery and extending along in a direction parallel to said first terminal to facilitate mounting the capacitor.

3. A thin ceramic capacitor, including, a metallic disc of high temperature conductive material forming one plate of the capacitor and having a flared periphery turned down in a direction perpendicular to the diametric axes of the disc to increase the structural strength of the disc, a thin layer of ceramic material forming the dielectric of the capacitor and fused to the side of said disc which is opposite to the direction that the flared periphery is turned down, a metallic layer forming a second plate of the capacitor and bonded to said thin ceramic layer, a first terminal for the capacitor attached to said metallic layer, and a second terminal for said capacitor attached to said metallic disc.

4. A thin ceramic capacitor for low voltage circuit applications, including, a disc of conductive material having a turned-down periphery forming a basin shape having a concave side and a convex side, said disc defining one plate of the thin ceramic capacitor, a layer of ceramic fused to said convex side of said disc to define the dielectric of the thin layer capacitor, and a layer of conductive material fused to said layer of ceramic to define a second plate of the thin ceramic capacitor.

5. A thin ceramic capacitor, including, a metal stamping having a thickness less than .050 inch and being in the shape of a disc having a turned down peripheral edge to increase the structural strength of a disc with a strip of metal extending from a portion of the turned-down peripheral edge to define one terminal of the capacitor, a thin layer of ceramic material fused to the metal stamping on the side of the disc further from the turned-down peripheral edge having a thickness less than 0.005 inch, a metallic layer fused to a portion of the ceramic material having a thickness less than 0.001 inch, and a strip of metal affixed to said metallic layer to define a second terminal of the capacitor.

6. A thin ceramic capacitive element, including, a metallic disc of high temperature conductive material forming a common plate of the capacitive element and having a flared periphery turned down in a direction perpendicular to the diametric axes of the disc to increase the structural strength of the disc, a thin layer of ceramic material forming one dielectric of the capacitor and fused to the side of said disc which is opposite to the direction that the flared periphery is turned down, a metallic layer forming one individual plate of the capacitive element and fused to said thin ceramic layer, a first terminal strip for the capacitive element soldered to said metallic layer, a second thin layer of ceramic material forming a second dielectric for the capacitive element and fused to the other side of said disc which side is the same as the direction that the flared periphery is turned down, a thin metallic layer forming a second individual plate of the capacitive element and attached to said second ceramic layer, a second terminal strip for the capacitive element soldered to said metallic layer forming the second plate of the capacitive element, and a common terminal strip affixed to said metallic disc.

7. In combination,
- a thin conductive member having a high melting temperature, the conductive member being constructed to define a first plate of a capacitor and to provide the structural support for the capacitor,
- the conductive member being provided with first and second oppositely disposed surfaces,
- a first thin film of dielectric material fused to the first surface on the conductive member to form the dielectric for a first capacitor,
- a first thin conductive film fused to the first dielectric film to form the second plate of the first capacitor with the thin conductive member,
- a second thin film of dielectric material fused to the second surface on the conductive member to form the dielectric for a second capacitor, and
- a second thin conductive film fused to the second dielectric film to form the second plate of the second capacitor with the thin conductive member.

8. The combination set forth in claim 7 in which each of the first and second dielectric film is provided with a coefficient of expansion substantially similar to the coefficient of expansion of the thin conductive member.

References Cited by the Examiner
UNITED STATES PATENTS

| | | | |
|---|---|---|---|
| 1,843,622 | 2/1932 | Norton | 317—261 |
| 2,159,793 | 5/1939 | Grundmann | 317—261 |
| 2,582,931 | 1/1952 | Kodama | 317—242 |
| 2,619,519 | 11/1952 | Marks | 317—261 |
| 2,758,267 | 8/1956 | Short | 317—258 X |
| 2,830,698 | 4/1958 | Coda | 317—242 |
| 2,877,389 | 3/1959 | Wiener | 317—101 |
| 3,041,511 | 6/1962 | Peck | 317—261 X |
| 3,114,868 | 12/1963 | Feldman | 317—261 X |

LEWIS H. MYERS, *Primary Examiner.*

JOHN F. BURNS, ROBERT K. SCHAEFER, LARAMIE E. ASKIN, *Examiners.*

E. GOLDBERG, *Assistant Examiner.*